United States Patent [19]

Yasukawa

[11] Patent Number: 5,745,704
[45] Date of Patent: Apr. 28, 1998

[54] DATA COMMUNICATION CONTROL DEVICE

[75] Inventor: Seiichi Yasukawa, Yotsukaido, Japan

[73] Assignee: Nikon Corporation, Tokyo, Japan

[21] Appl. No.: 522,661

[22] Filed: Sep. 1, 1995

[30] Foreign Application Priority Data

Oct. 28, 1994 [JP] Japan .................................. 6-265672

[51] Int. Cl.$^6$ .......................... G06F 15/16; G06F 13/42; H04L 12/60
[52] U.S. Cl. ...................................... 395/200.8; 370/463
[58] Field of Search ........................ 395/200.2, 200.18, 395/881, 891, 200.1, 200.76, 200.5, 200.8; 370/463

[56] References Cited

U.S. PATENT DOCUMENTS

| | | | |
|---|---|---|---|
| 4,710,871 | 12/1987 | Belknap et al. | 370/463 |
| 4,744,079 | 5/1988 | Csapo et al. | 370/463 |
| 4,815,099 | 3/1989 | Shimatani et al. | 370/463 |
| 4,891,783 | 1/1990 | Aritaka et al. | 395/200.1 |
| 5,506,965 | 4/1996 | Naoe | 395/200.2 |

OTHER PUBLICATIONS

Texas Instruments Data Sheet; TL16C450; Data Transmission Circuits Data Book; pp. 3-3 to 3-25, 1993.

*Primary Examiner*—Larry D. Donaghue
*Assistant Examiner*—Mark H. Rinehart

[57] ABSTRACT

A data communication device adapted to notify abnormal transmission timing at the start of transmission. A receiving register, synchronized with synchronous signal, receives input data via an upper transmission path from a facing instrument. The receiving register performs a serial-parallel conversion on the input data. A receiving control unit detects the completion of the serial-parallel conversion and restores transmitted data, delivered on the upper transmission path from the facing equipment, by sequentially combining the serial-parallel converted input data. A transmitting register receives transmission data of predetermined word length and parallel-serial converts the transmission data in synchronization with the synchronous signal. The transmitting register delivers the parallel-serial converted output data to a lower transmission path. A transmission control unit generates plural data formed by dividing, at intervals based on the predetermined word length, the transmission data. The transmission control unit sequentially provides the plural data to the transmission register when the completion of the parallel-serial conversion is detected. A transmission state monitoring unit which determines whether delivery of the transmission data has been completed when a predetermined time difference has elapsed from when the serial-parallel conversion is completed, and outputs this result as transmission state data.

12 Claims, 10 Drawing Sheets

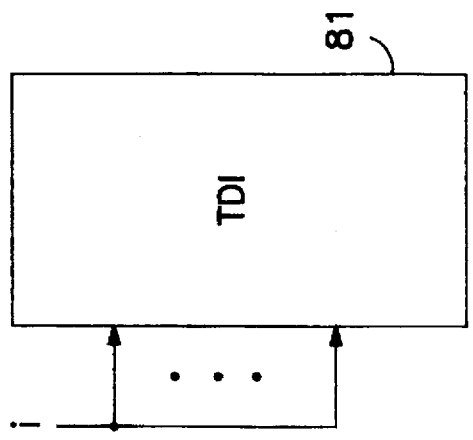
FIG. 8
PRIOR ART
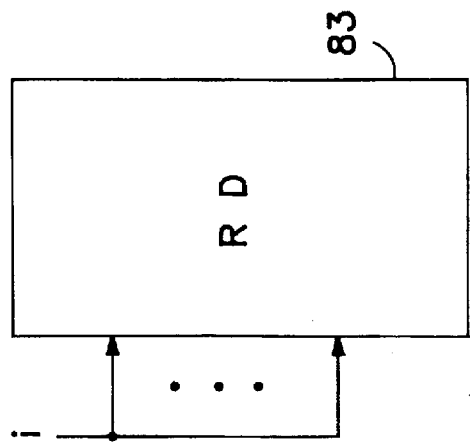
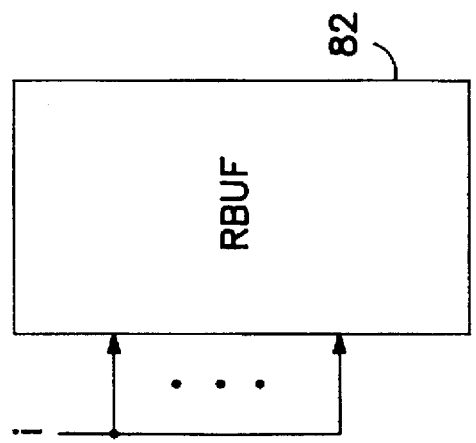
FIG. 9
PRIOR ART

DATA COMMUNICATION CONTROL DEVICE

BACKGROUND OF THE INVENTION

1. Field of the Invention

The present invention relates to a data communication control device, and in particular to electronic equipment having a function distribution or load distribution among a plurality of processors in which, mutual communication between the processors is performed via a full duplex transmission path.

2. Description of the Related Art

In cameras, or other electrical equipment, designed with a function distribution or load distribution across a plurality of processors, individual processors transmit and receive various control data to perform cooperative action under mutual accurate synchronism. An inexpensive full duplex serial transmission method is frequently used which entails a small reduction in speed, in comparison with the method of transmitting all the bits of transmitted data synchronously via plural communication paths.

FIG. 7 is a diagram of a known data communication control device. Multiple processors, or stations (here, for the sake of simplicity, there are two) are loaded into a piece of electronic equipment. A master station 71 is provided on one side, and a slave station 72 is provided on the other side. The master station 71 and the slave station 72 are connected via a lower transmission path 73D, an upper transmission path 73U, a CS signal line 74 and a clock signal line CLK 75.

The upper transmission path 73U is connected to a serial input of a receiving register (RDR) 76 in the master station 71. A control output of the (RDR) 76 is connected to the input of a receiving status register (RE) 77. The serial output of a transmission register (TDR) 78 is connected to the lower transmission path 73D. The control output of the TDR 78 is connected to the input of a transmission status register (TE) 79. The clock signal line CLK 75 is connected to the clock inputs of the receiving register (RDR) 76 and the transmission register (TDR) 78. The parallel output of the receiving register (RDR) 76 is connected to the corresponding input port of a processor (CPU) 80. The first and second output ports of the processor (CPU) 80 are respectively connected to the parallel inputs of the CS signal line 74 and a parallel input of the TDR 78. Special input-output ports of the CPU 80 are connected to access terminals of the RE 77 and the TE 79.

FIG. 8 is a diagram of a known transmitting buffer. FIG. 9 is a diagram of a known receiving buffer. The CPU 80 has a transmission buffer (TDI) 81 on a main memory (not shown), a temporary storage region (RBUF) 82 and a permanent storage region (RD) 83. A pointer i shows the next available address for writing to the transmission buffer (TDI) 81 and the temporary storage region (RBUF) 82. For the sake of simplicity, the transmission data (packet) or to be communicated to the slave station 72 is stored beforehand in the transmission buffer (TDI) 81.

FIG. 10 is a flow chart of the operation of the known data communication control device. In step 401, the processor 80, starting a previously determined synchronous communication process task, sets the pointer i to "1". In step 401(a), the processor resets, with every predetermined transmission unit (here taken as 8 bits for the sake of simplicity), the flag COME. The flag COME indicates whether the transmission is completed. The processor 80, continuing the initial setting, reads out the unit data (as one having a word length equal to the transmission unit), constituting the transmission data to be transmitted, from the region of the transmission buffer 81 shown by the pointer i, and writes the unit data into the transmission register 78 in step 402.

Thereafter, in step 403, the processor 80 resets the RE 77 and the TE 79. In step 404, the processor permits the reception of an interrupt. In step 405, the processor 80 sets the logic level of the CS signal line to a low level. In step 406, the processor waits until the COME flag is set.

FIG. 11 is a timing chart of the operation of a known communication control device. When, in the slave station 72, it is recognized that the logic level of the CS signal line has become low, at time (1), a clock signal is transmitted on the clock signal line 75 at time (2). The transmission data, to be transmitted to the master station 71, having a word length equal to that of the transmission data unit, is transmitted on the upper transmission path 73U, synchronously with this clock signal at time (3).

Moreover, at the master station 71, the transmission register 78 transmits, synchronously with the clock signal, the preceding written unit data to the lower transmission path 73D. The parallel receiving register 76 converts the unit data provided from the slave station 72 via the upper transmission path 73U, from serial to parallel.

The slave station 72 counts the number of cycles of the clock signal transmitted on the clock signal line 75. When the slave station 72 counts to "8", the transmission of the clock signals is temporarily stopped. The transmission of the unit data with respect to the upper transmission path 73U is also temporarily stopped.

FIG. 12 is a flow chart of the operation of a known communication control device. Moreover, in the master station 72, the receiving register 76, when the last bit constituting the unit data has been accumulated, sets the RE 77. The RE 77 provides a receiving interrupt signal to the processor 80. In step 501, the processor 80 starts a receiving interrupt process, according to the receiving interrupt signal, reads out the unit data retained in the receiving register 78, and temporarily stores the unit data in the temporary storage region RBUF(i), pointed to by the pointer i. In step 502, the processor 80, by resetting RE 77, enables a state in which it is possible to store the succeeding unit data, which the receiving register 76 receives from the slave station 72. A serial-parallel conversion is performed on the unit data. The processor 80 compares the value of the pointer i and the value of the size N of the transmission data (here, for the sake of simplicity, the number of transmission units is given) in step 502(a). When the pointer i is smaller than the size N, step 503 is proceeded to. In step 503, the processor 80 increments the pointer i, reads out the succeeding unit data from the receiving buffer TDI(i) pointed to by pointer i, writes the succeeding unit data in the transmission register 78, resets the TE 79, and completes the receiving interrupt process.

The receiving register 76 and the transmission register 78 operate, under the control of the RE 77 and the TE 79, which have been reset to a state in which transmission becomes possible while receiving succeeding unit data, as long as the logic value of the CS signal, provided via the CS signal line 74, is "0". In steps 401–406 and 501–503, unit data, equal to the size N of the transmission data, which is set by means of an agreement with the master stations, is sequentially transmitted. Moreover, the processor 80 recognizes that the pointer i has become greater than the size N and thereafter sets the flag COME, completing the receiving interrupt process in step 504.

On the other hand, in the communication process task, when the flag COME is set, the processor 80, by setting the logic level of the CS line 74 to a high level, holds the transmission commencement of the succeeding transmission data to the slave station 72, in step 407 (at time (5) in FIG. 11). In addition, the processor 80 inhibits the receipt of the receiving interrupt at step 408. The processor 80, by transmitting all the unit data accumulated in the temporary storage region 82 to the permanent storage region 83, completes the communication process at step 409. The transmission data, transferred to the permanent storage region 83 in the master station 71, is suitably referred to as the calculation subject for the process effected by the processor 80.

However, in this prior art case, the processor 80, in addition to the described interrupts, is required to handle timer interrupts provided by a monitored timer, and interrupts provided from external input-output devices. The priority ranking of the interrupts is not always set at the highest position. Moreover, in the course of an individual interrupt processes, which are started according to these interrupts, temporary interrupts for resource management or other objectives, calculations are performed which set the processor 80 to an interrupt inhibition state. Accordingly, a receiving interrupt process may be started after a great delay, and the process of performing the start of transmission of the unit data, in step 503, is commenced after a greater delay than the execution process time of the preceding process in steps 501 and 502. However, when the transmission is delayed, until after the succeeding unit data is delivered from the salve station 72, the timing of the delivery of the top bit of the data delivered is shifted by a number of bits from the normalized timing. This occurs when the succeeding receiving interrupt arose and the residual bits in the transmitting register 78 went into a buffered state. Furthermore, the slave station 72 cannot recognize this state, and recognizing normalized unit data continues, causing the unit data to be transmitted via the lower transmission path 73D.

SUMMARY OF THE INVENTION

Accordingly, it is an object of the present invention to provide a communication control device which reliably detects abnormal communication operation originating from delays of the start timing of interrupt processes, and furthermore which can smoothly start a restoration process in the leading transmission corresponding to a transmission operation.

Additional objects and advantages of the invention will be set forth in part in the description which follows, and, in part, will be obvious from the description, or may be learned by practice of the invention.

The above objects of the present invention are achieved in a data communication control device comprising a receiving register for performing serial-parallel conversion, synchronized with a synchronous signal, of a unit length data provided via an upper transmission path from a facing equipment, a receiving control unit for monitoring the progress and detecting the completion of the serial-parallel conversion, the receiving control unit combining the data produced by the serial-parallel conversion and restoring transmission data delivered from the facing equipment, a transmission control unit for providing plural data, generated by dividing transmission data to be transmitted to the facing equipment via the lower transmission path into predetermined word lengths, to a sequential transmission register when a predetermined time difference has elapsed from when the serial-parallel conversion has completed.

Objects of the present invention are also achieved in a data communication control device as set forth above wherein the serial-parallel conversion is performed in the course of an interrupt process, and when the starting of all interrupt processes is controlled, delaying is commenced until the interrupt is cancelled, moreover, when other interrupt processes having a high priority ranking are started, the interrupt process is commenced, delaying until completion.

Objects of the present invention are achieved in a data communication control device as set forth above in which, the transmission state monitoring unit, when more than the predetermined time difference has elapsed, after the completion of the serial-parallel conversion, determines whether the delivery of the data on the lower transmission path, has been completed and outputs the result as transmission state data, the predetermined time difference, being based on a minimum value of the effective processing speed permitted by the transmission control unit.

Objects of the present invention are also achieved in a data communication control device as set forth above in which, a synchronous signal is provided as a bit synchronous signal providing a transmission speed of data transmitted via the lower transmission path and the upper transmission path, and wherein the facing equipment does not contain hardware which forms such bit synchronous signals.

Objects of the present invention are also achieved in a data communication control device as set forth above in which the word lengths of the data transmitted via the lower transmission path and of the data transmitted via the upper transmission path are made equal, and the receiving control unit and the transmission control unit uses a common frame synchronism with regard to data to be transmitted and received.

Objects of the present invention are also achieved in a data communication control device as set forth above in which, the notification unit transmits to the facing equipment via a bus, other than the lower transmission path, of transmission state data which is output by the transmission state monitoring unit.

Objects of the present invention are further achieved by a data communication control device comprising a receiving register, synchronized with a synchronous signal, which receives input data via an upper transmission path from a facing equipment and performs a serial-parallel conversion on the input data, a receiving control unit which detects the completion of the serial-parallel conversion and restores transmitted data, delivered on the upper transmission path from the facing equipment, by sequentially combining the serial-parallel converted input data, a transmitting register which receives data transmission of predetermined word length and parallel-serial converts the transmission data in synchronization with the synchronous signal and delivers the parallel-serial converted output data to a lower transmission path, a transmission control unit which generates plural data formed by dividing, at intervals based on the predetermined word length, the transmission data, the transmission control unit sequentially providing the plural data to the transmission register when the completion of the parallel-serial conversion is detected, and a transmission state monitoring unit which determines whether delivery of the plural data has been completed when a predetermined time difference has elapsed from when the serial-parallel conversion is completed, and output the result as transmission state data.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 8 is a diagram of a known transmitting buffer.

FIG. 9 is a diagram of a known receiving buffer.

DESCRIPTION OF THE PREFERRED EMBODIMENTS

Figure 1:
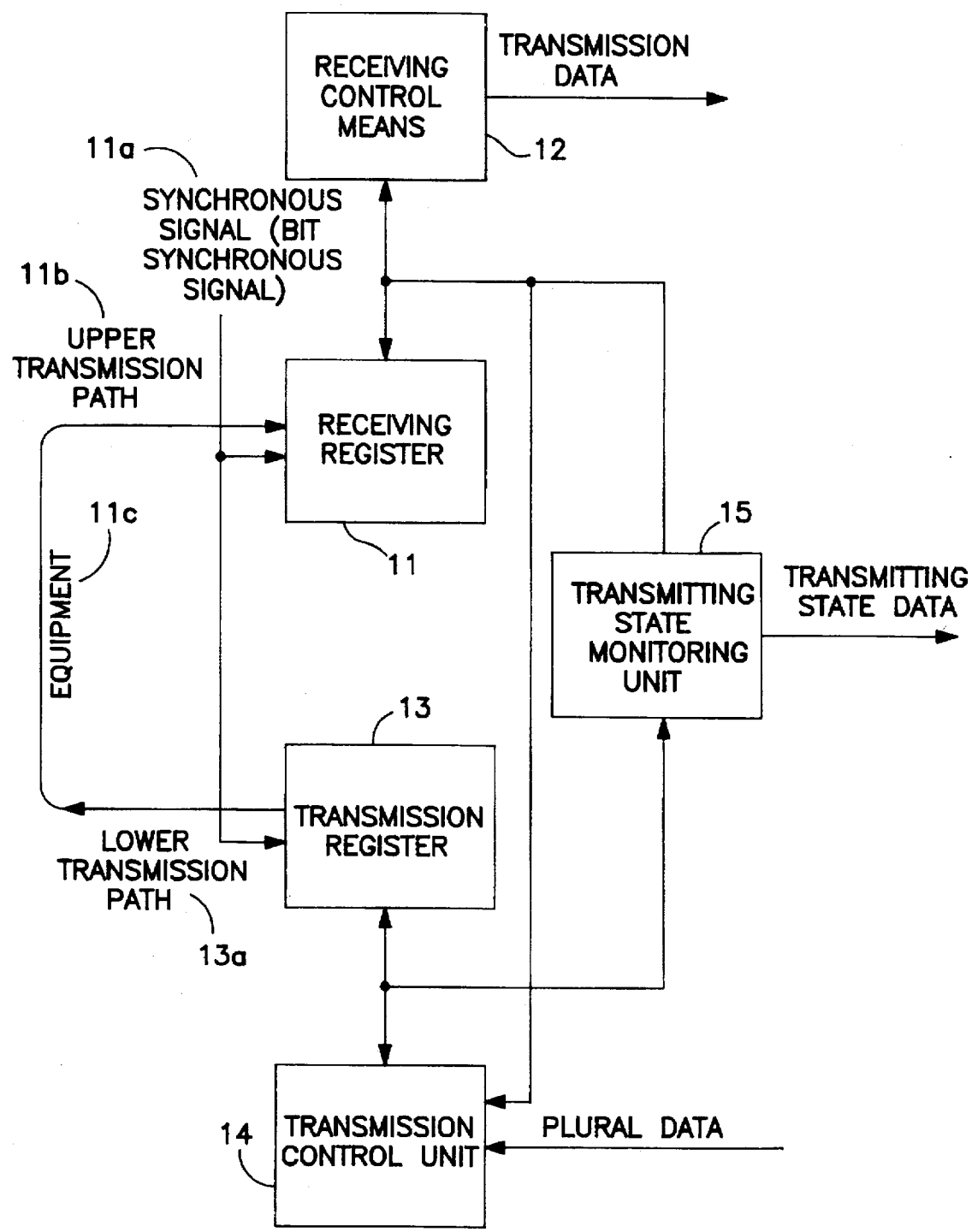
FIG. 1 is a block diagram of a data communication control device in accordance with a first preferred embodiment of the present invention.

Reference will now be made in detail to the present preferred embodiments of the present invention, examples of which are illustrated in the accompanying drawings, wherein like reference numerals refer to like elements throughout.

Figure 7:
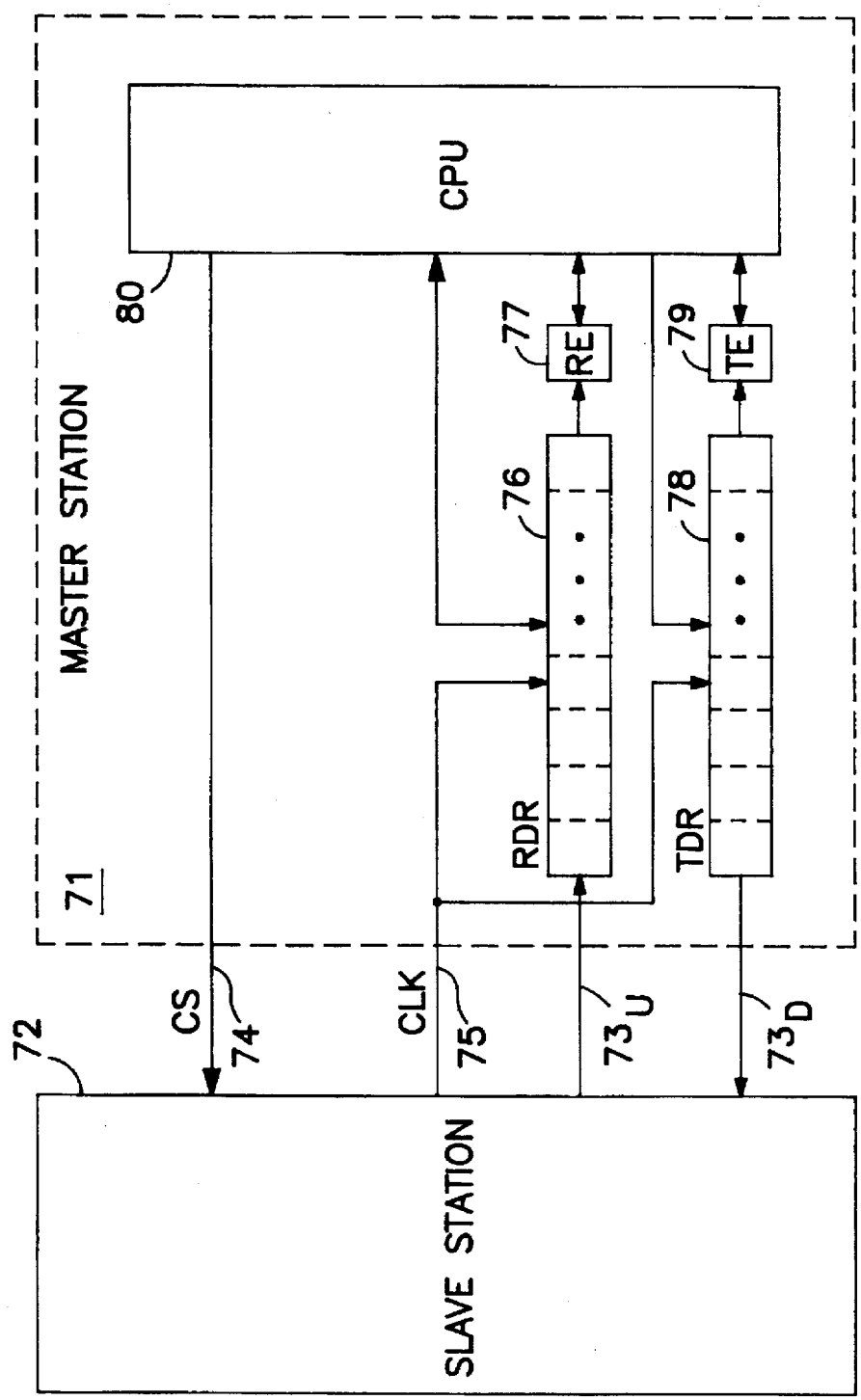
FIG. 7 is a diagram of a known data communication control device.

FIG. 1 is a block diagram of a data communication control device in accordance with a first preferred embodiment of the present invention. In general, the data communication control device of the present invention can be practiced on the hardware set forth in FIG. 7. A data communication control device, for a processor in a piece of equipment, is equipped with a serial-parallel conversion receiving register 11 which is synchronized with a synchronous signal. The serial-parallel conversion receiving register 11 receives unit length data via an upper transmission path 11b from a facing equipment 11c, i.e. another processor in the same or different piece of equipment. A lower transmission path 13a forms a full duplex line with the upper transmission path 11b. A receiving control unit 12 monitors the progress of the serial-parallel conversion and detects the completion thereof. The receiving control unit 12 also restores transmitted data, delivered on the upper transmission path 11b from the facing equipment 11c by sequentially combining the serial-parallel converted data. A transmitting register 13, provided with information having predetermined word length, transmits the converted data, parallel-serial converted, synchronized with the synchronous signal, on the lower transmission path 13a. A transmission control unit 14 provides plural data by dividing, at intervals of the predetermined word length, the transmission data to be transmitted to the facing equipment 11c. The transmission control unit 14 sequentially provides this data to the transmission register 13 when, by monitoring the progress of the parallel-serial conversion, the completion of this parallel-serial conversion is detected. A transmission state monitoring unit 15 determines whether delivery of the data has been completed when a predetermined time difference has elapsed from the completion of the serial-parallel conversion. The result of the determination is output as transmission state data. The predetermined time difference is set based on a minimum processing speed of the transmission control unit 15.

Further, a bit synchronous signal may be used to provide a data propagation rate of the data propagated. The bit synchronous signal is provided as synchronous signals via the lower transmission path 13a and the upper transmission path 11b. The work lengths of the data propagated via the lower transmission path 13a and the upper transmission path 11b are preferably equal.

Figure 2:
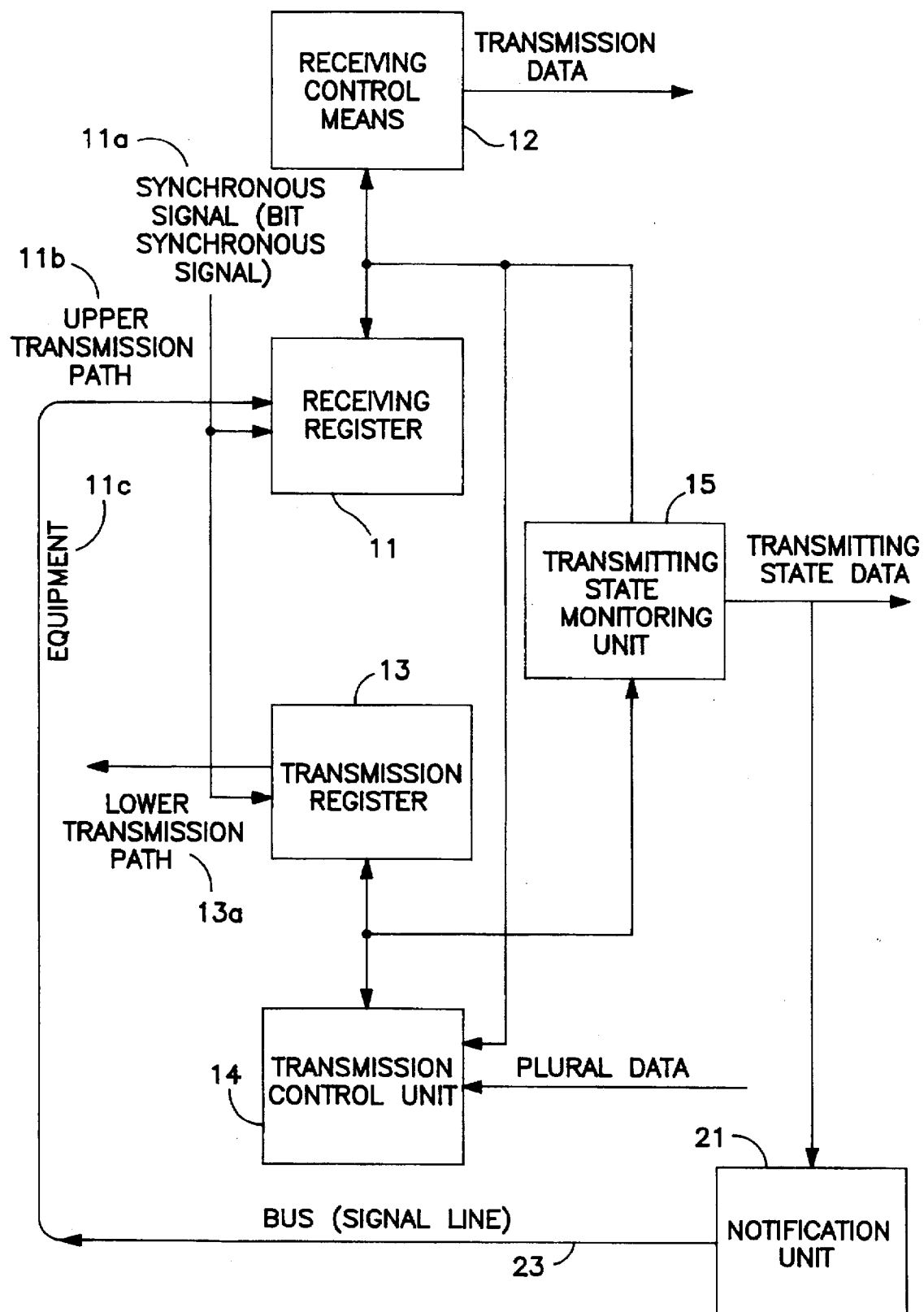
FIG. 2 is a block diagram of a data communication control device in accordance with a second preferred embodiment of the present invention.

FIG. 2 is a block diagram of a data communication control device in accordance with a second preferred embodiment of the present invention. A notification unit 21 is provided which transmits, to the facing equipment 11c, via a bus 23, outside the lower transmission path 13a, the transmission state data. Preferably the bus 23 is a signal line used to notify to the facing equipment 11c of data delivery required by the facing equipment 11c on the upper transmission path 11b or of the commencement of the transmission of data on the lower transmission path.

Figure 3:
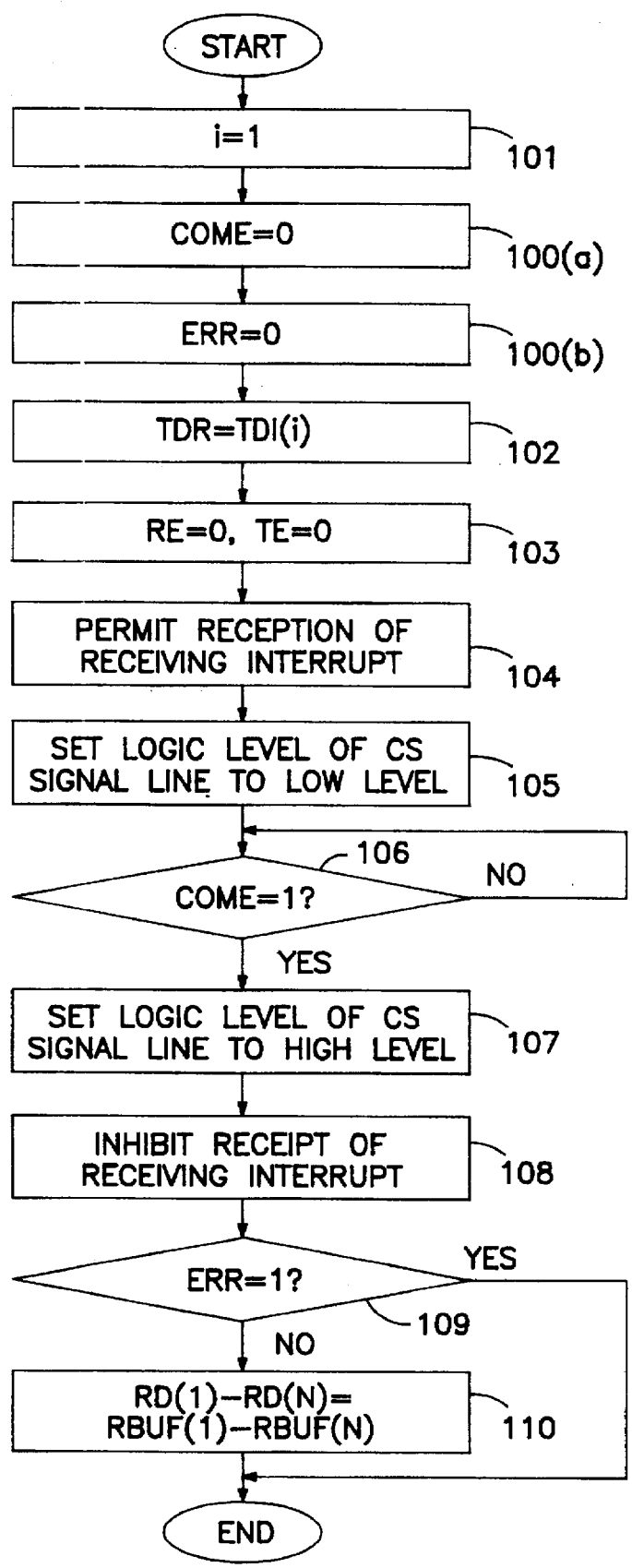
FIG. 3 is a flow chart of the operation of a data communication control device in accordance with the preferred embodiments of the present invention.
Figure 4:
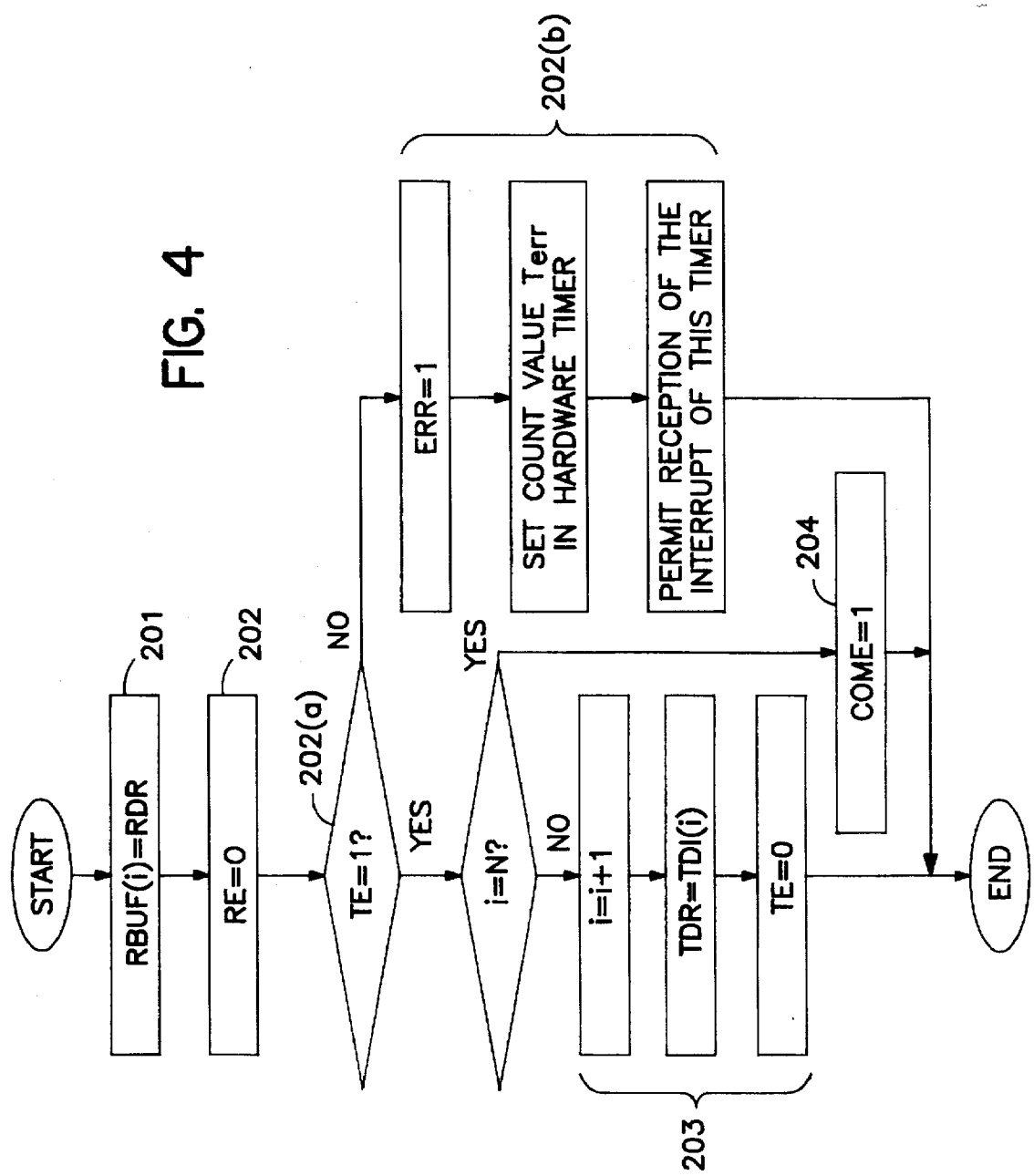
FIG. 4 is a flow chart of the operation of a data communication control device in accordance with the preferred embodiments of the present invention.
Figure 5:
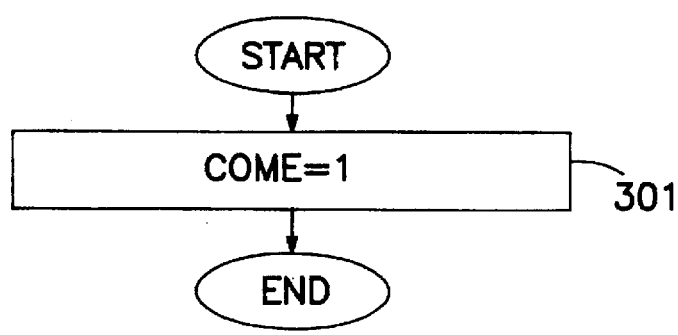
FIG. 5 is a flow chart of the operation of a data communication control device in accordance with the preferred embodiments of the present invention.
Figure 12:
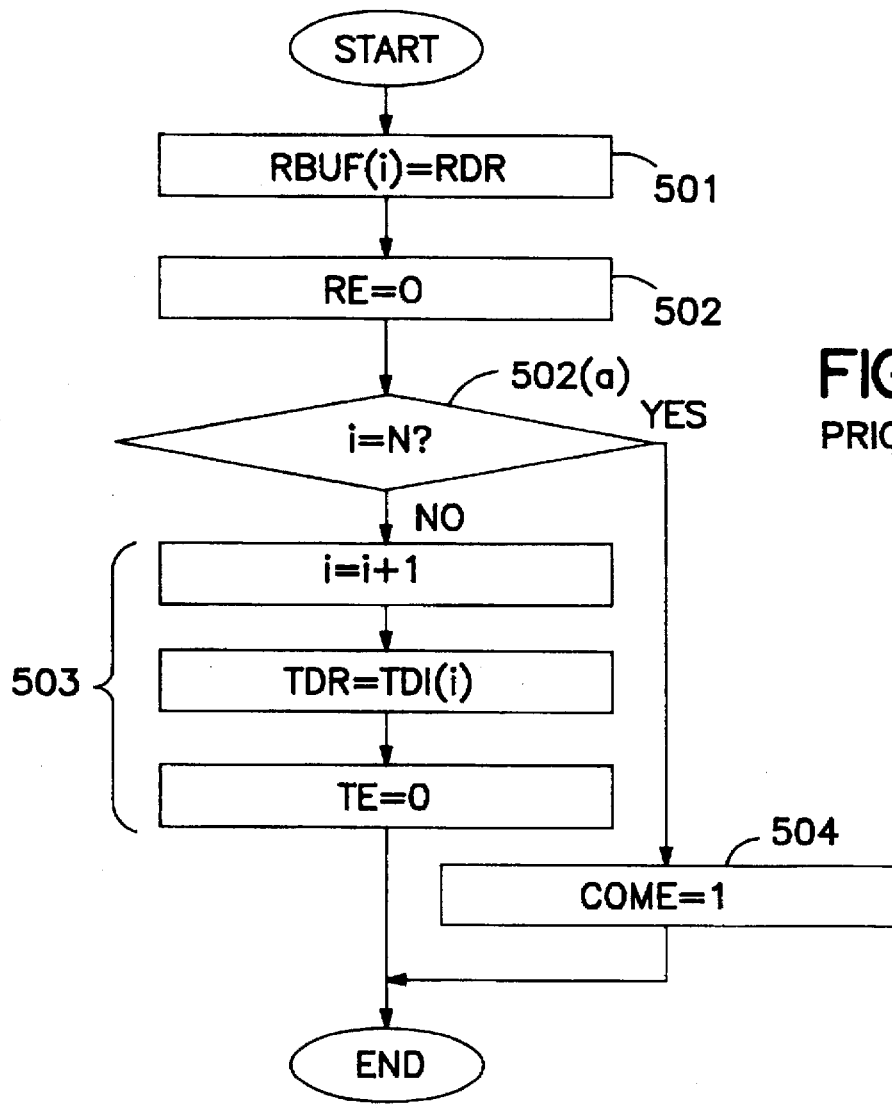
FIG. 12 is a flow chart of the operation of a known communication control device.
Figure 6:
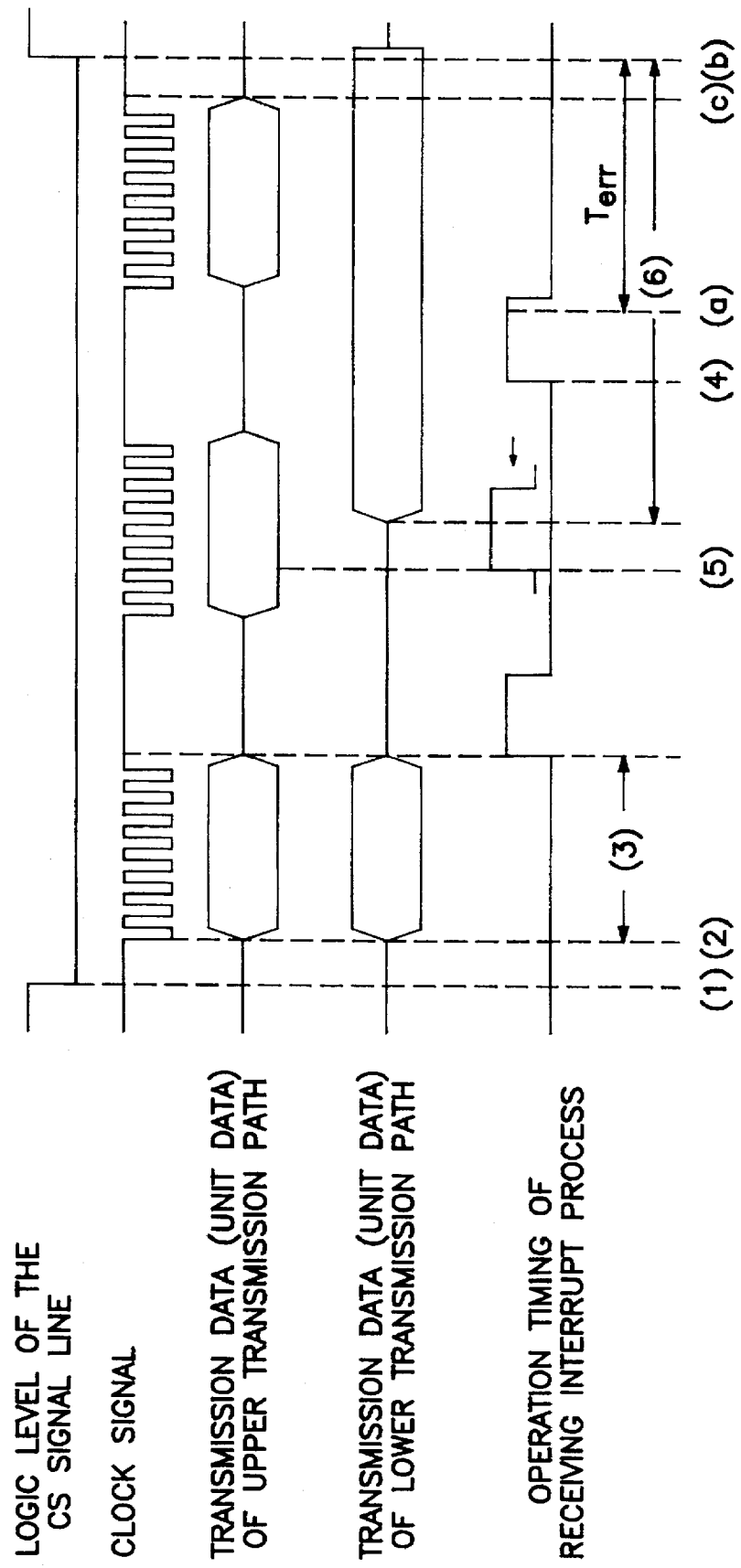
FIG. 6 is a timing chart of the operation of a data communication control device in accordance with the preferred embodiments of the present invention.
Figure 11:
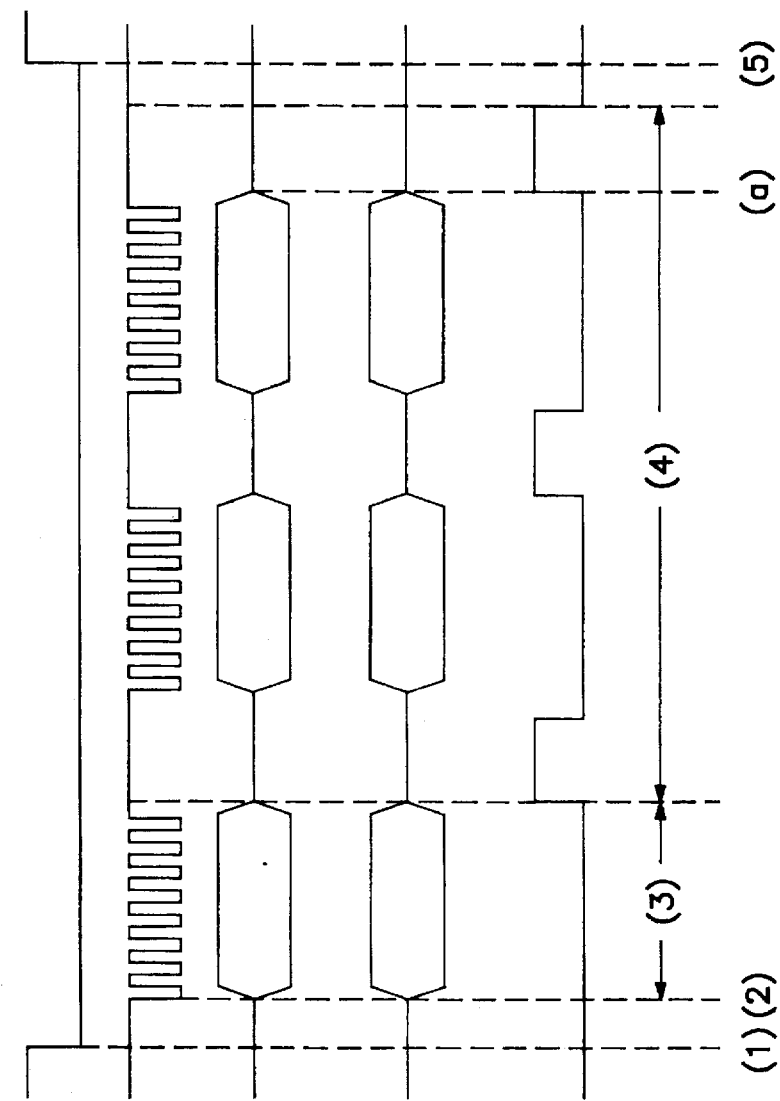
FIG. 11 is a timing chart of the operation of a known communication control device.
Figure 6:
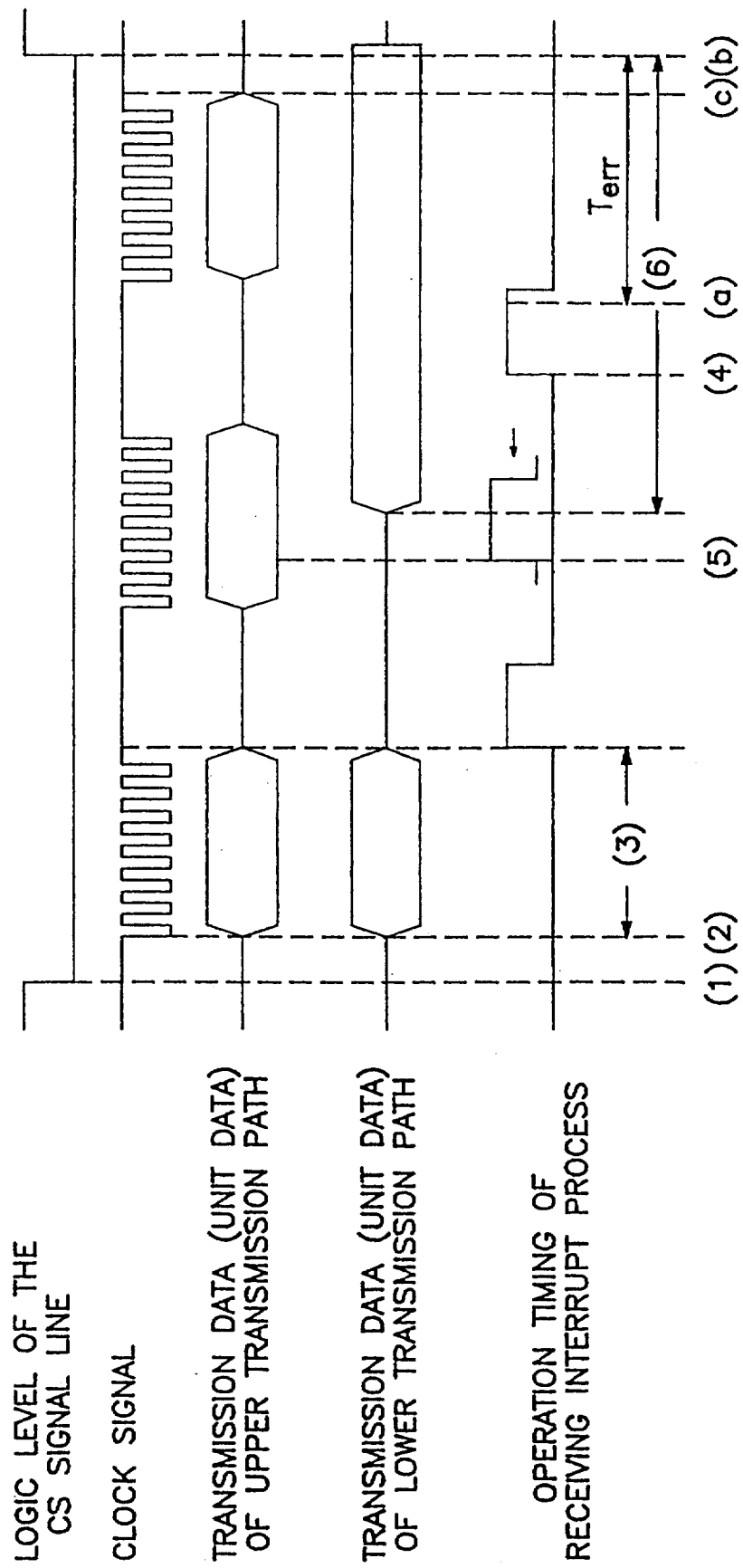
Figure 10:
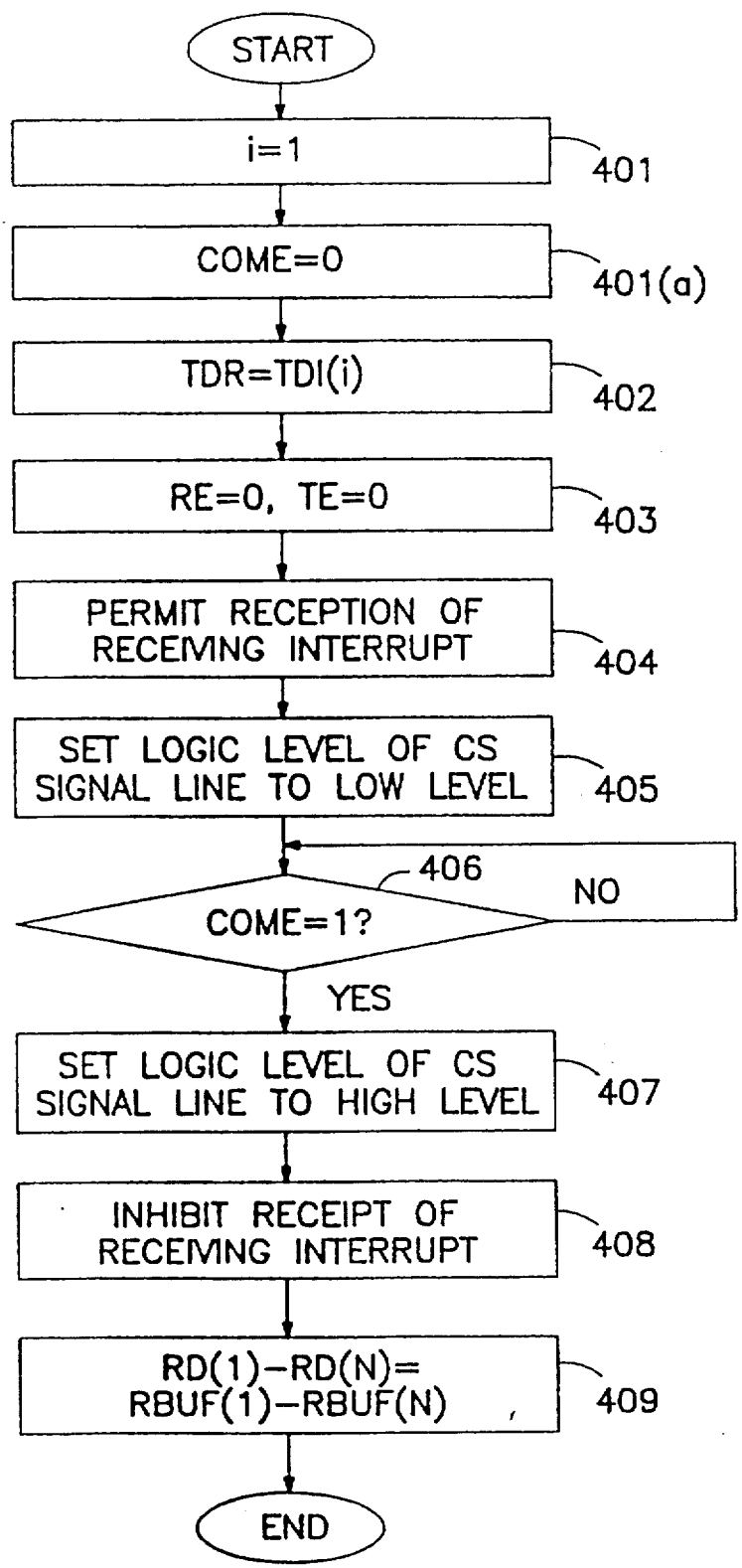

FIG. 3 is flow chart of a data communication control device in accordance with the preferred embodiments of the present invention. FIG. 4 is a flow chart of a data communication control device in accordance with the preferred embodiments of the present invention. FIG. 5 is a flow chart of a data communication control device in accordance with the preferred embodiments of the present invention. FIG. 6 is a timing chart of a data communication control device in accordance with the preferred embodiments of the present invention. Only those steps which differ from the prior art process, set forth in FIGS. 11 and 12, will be described hereinafter. In the following, the processor 80 has a hardware timer, in addition to a timer which starts the communication process tasks. The following description is given with reference to the hardware set forth in FIG. 7. In the following description, the receiving register 76 corresponds to the receiving register 11, the transmitting register 78 corresponds to the receiving register 13, RE 77, TE 79 and the processor 80 correspond to the receiving control unit 15 and the notification unit 21, and the CS signal line 74 corresponds to the signal line 23.

Figure 10:
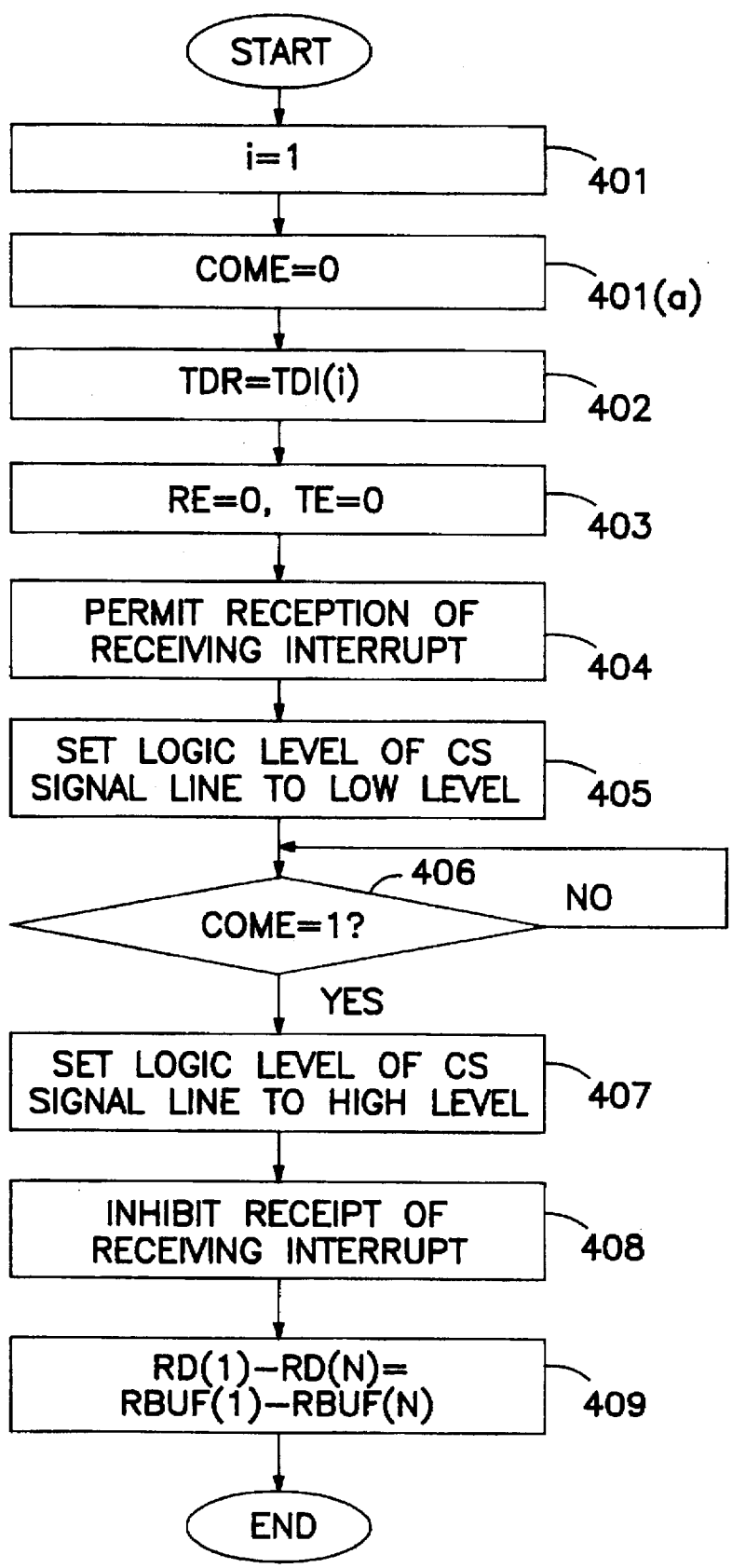
FIG. 10 is a flow chart of the operation of a known communication control device.

In the data communication control device configured in accordance with the first preferred embodiment of the present invention, the processor 80 has an error flag ERR (not shown) in the main memory (not shown). During the initial setting of a communication processing task, the logic level of the error flag ERR is initially set to "0" in step 101(b). In general, the transmission and reception of normal unit data (transmission data) is similar to process as set forth in FIG. 10, i.e. steps 102 to 106 correspond to steps 402 to 406.

During the course of the transmission and reception of unit data, when the processor 80, while performing a process in an interrupt inhibition state, performs another interrupt process having a high priority ranking which generates a receiving interrupt, after the commencement of delivery from the slave station 72 of succeeding unit data, the receiving interrupt process is commenced. Thereafter, succeeding unit data is written into the transmission register 78 at times (4) and (5) in FIG. 6. The unit data is delivered to the lower transmission path commencing from the second period of the clock signal supplied from the slave station 74, via the clock signal line 75, see time (6) in FIG. 6. When the succeeding receiving interrupt has been generated, there is a residue in the transmitting register 78 of bits to be transmitted, and the TE 79 is not set.

The processor 80 stores the unit data, retained in the receiving register 76, in the temporary storage region 82. When RE 77 is reset in steps 201 and 202, the processor 80 checks the logic value of TE 79 in step 202(a). When the logic value is a "1", the processor 80 recognizes that the transmission of the preceding unit data was normally completed and thereafter performs a process, similar to the prior art, in steps 203 and 204.

However, if the logic value of TE 79 is a "0", the processor 80 recognizes that the transmission of the preceding unit data was begun after a delay. The processor 80 sets the logic value of the error flag ERR to a "1", sets the hardware timer to a count value of $T_{err}$ and enables the receipt of an interrupt according to the final count of the hardware timer in step 202(b).

The hardware timer, counts a value $T_{err}$ and provides an interrupt signal to the processor 80 after reaching a predetermined final count. The processor 80, in accordance with the interrupt signal, starts the interrupt process shown in FIG. 5. In step 301, the processor 80 sets the logic value of the flag COME to "1".

When the logic value of the flag COME is set to "1", even when the transmission of the unit data is abnormally delayed, the processor sets the logic value of the CS signal line 74 to a high level and requires holding, in step 107 (at time (b) in FIG. 6), of the commencement of transmission of the succeeding transmission data to the slave station 72. Additionally, the processor 80, at step 108, inhibits the receipt of a receiving interrupt. When the error flag ERR is set to "0" in step 109, all the unit data has been normally transmitted, and the processor 80 completes the process in step 110, after transferring all the unit data buffered in the temporary storage region 82 to the permanent storage region 83.

However, when the error flag ERR is set to "1", because the slave station 72 cannot accurately receive the transmitted unit data, some of which have been transmitted with abnormal delays, the process is completed by omitting the process of transferring the contents of the temporary storage region 82 to the permanent storage region 83.

By delaying the start of a receiving interrupt process, originating in the starting of a high priority interrupt process in the course of this interrupt process, the timing of writing the succeeding unit data into the transmitting register 78 is delayed. Because the transmission of this unit data was not normally performed, the transmission process is truncated while suppressing a fall in data transfer efficiency. By resending, or other corresponding measures, execution is smoothed.

During an interrupt where all the unit data are normally transmitted, the COME flag is set to "1" in step 204 when the last unit data is received. In response, the communication process task, sets the logic level of the CS signal line 74 to a high level in steps 106 and 107. However, if some of the data units are not normally transmitted, the COME flag is also set to a logic level of "1", in step 301, during an interrupt process started according to an interrupt signal output by the hardware timer. Until this flag is recognized at step 106, the logic level of the CS signal line 74 is maintained at the low level.

The slave station 72, measures the time required for the logic level of the CS signal line 74 to return to the high level from the time (time (c) in FIG. 6), when the delivery of the last unit data was completed. If a maximum value is exceeded (for example from times (a) to (b) in FIG. 11), some unit data were not normally received.

The slave station 72, reliably recognizes that some of the received unit data, are not normal because the start was delayed in the interrupt process in the master station 71. The slave station 72 can quickly start a process corresponding to such a state.

Although the first embodiment of the present invention has been described with respect to a specific configuration, it will be recognized that the first embodiment is no limited to the specific configuration. For example, any method of reliably causing notification to the slave station 72 may be used, for example, a dedicated signal line may be disposed to the slave station 72. Moreover, where a dedicated signal line is used, the hardware timer is not needed, if this signal line is accessed, because it is possible to quickly transmit a notice of situation. Furthermore, individual interrupt processes are effected on monolevel, but it is possible to use multiplex interrupts.

Moreover, transmission and reception are described as being performed in parallel, but if the time difference between the two is known and the deviation of this value is limited within a predetermined range, it is possible to use other methods. Furthermore, where the transmission timing of unit data becomes abnormal, with respect to the lower transmission path, the transmission unit data and the unit data received from the slave station, via the parallel upper transmission path, are abandoned, but attempts can be made to recover the unit data.

Moreover, a clock signal is described as being provided by slave station to the master station, but, for example, the master station 71 may generate and provide a clock signal to the slave station 72. Further, each stations may use a separately disposed clock generator in common. Furthermore, the clock signals, are not limited to those providing transmission speeds of unit data transmitted via the lower transmission path and the upper transmission path. For example, synchronous signals may provide the transmission timing of the unit data. It is possible to set these synchronous signals corresponding to the difference and combination of the word length and the transmission speed of unit data transmitted on the upper transmission path and the lower transmission path. Moreover, a start-stop period method is described as the transmission method of the upper transmission path and the lower transmission path, but word length, transmission speed, parity bit, start bit, stop bit, or other feature of the unit data, may be used.

In general, as described hereinabove, in accordance with the first preferred embodiment with processing according to the completion of reception of data received via the upper transmission path, it is determined in parallel whether the preceding data on the lower transmission path is transmitted with a delay of more than a predetermined time, and the result is output as transmission state data. Accordingly, it can be accurately detected whether data delivery was performed with respect to the lower transmission path at an abnormal timing originating in delay of the process of transmission control means. It is therefore possible to accurately carry out communication processes corresponding to such a state. If a bit synchronous signal is used to provide a transmission speed of data transmitted, via the lower transmission path and the upper transmission path, as synchronous signals, the hardware does not contain specialized hardware for forming such bit synchronous signals, resulting in cost reduction, miniaturization, and a reduction in power consumption. Further, if the word length of data transmitted via the lower transmission path and the upper transmission path is equal, a common frame synchronism is possible and the hardware can be simplified.

In accordance with the data communication control device configured in accordance with the second preferred embodiment of the present invention, a notification unit 21 notifies to the equipment, via a path outside the lower transmission state monitor unit 15. The transmission state monitor 15 can accurately recognize that the data has not been received with normal timing, and can start a corresponding communication process. Further, if a signal line of 2-value signals is used, the signal line may be conjointly used as a bus 23. The handshake of communication via the transmission paths using a 2-value change signal line similar notification is therefore accurately and inexpensively performed.

Although the second embodiment of the present invention has been described with respect to a specific configuration, it will be recognized that the second embodiment is not limited to the specific configuration.

Although a few preferred embodiments of the present invention have been shown and described, it would be appreciated by those may bed in the art that changes may be made in these embodiments without departing from the principles and spirit of the invention, the scope of which is defined in the claims and their equivalents.

Accordingly, while restraining the limitations of the hardware and software of processors sharing individual functions or loads, cooperative action is reliably performed by function division and load division, and reliability and performance are increased. Moreover, because of the insignificant additional requirements of the hardware and software, cost reduction and miniaturization can be designed in parallel.

What is claimed is:

1. A data communication control device comprising:
   a receiving register, synchronized with a synchronous signal, which receives input data via an upper transmission path from a facing equipment and performs a serial-parallel conversion on the input data;
   a receiving control unit which detects the completion of the serial-parallel conversion and restores transmitted data, delivered on the upper transmission path from the facing equipment, by sequentially combining the serial-parallel converted input data;
   a transmitting register which receives data transmission of predetermined word length and parallel-serial converts the transmission data in synchronization with the synchronous signal and delivers the parallel-serial converted output data to a lower transmission path;
   a transmission control unit responsive to interrupts which generates plural data formed by dividing, at intervals based on the predetermined word length, the transmission data, said transmission control unit sequentially providing the plural data to said transmission register when the completion of the parallel-serial conversion is detected, said transmission control unit delaying transmission of plural data in response to an external interrupt; and
   a transmission state monitoring unit which determines whether delivery of the parallel-serial converted output data has been completed after the serial-parallel converted in-put data has been restored, the transmission state monitoring unit outputs the result as a transmission state signal.

2. A data communication control device, as set forth in claim 1, further comprising:
   a notification unit which transmits to the facing equipment, via a path other than the lower transmission path, transmission state data output by said transmission state monitor unit.

3. A data communication control device, as set forth in claim 2, further comprising:
   a bus having a signal line to notify the facing equipment of data required by the facing equipment on the upper transmission path and the transmission commencement of data on the lower transmission path.

4. A data communication control device, as set forth in claim 1, wherein the predetermined time difference is based on a minimum processing speed of the transmission control unit.

5. A data communication control device, as set forth in claim 4, further comprising:
   a notification unit which transmits to the facing equipment, via a path other than the lower transmission path, transmission state data output by said transmission state monitor unit.

6. A data communication control device, as set forth in claim 4, further comprising:
   a bus having a signal line to notify the facing equipment of data required by the facing equipment on the upper transmission path and the transmission commencement of data on the lower transmission path.

7. A data communication control device, as set forth in claim 1, wherein a bit synchronous signal is used to provide a data transmission rate of data transmitted as synchronous signals via the lower transmission path and the upper transmission path.

8. A data communication control device, as set forth in claim 7, further comprising:
   a notification unit which transmits the facing equipment, via a path other than the lower transmission path, transmission state data output by said transmission state monitor unit.

9. A data communication control device, as set forth in claim 8, further comprising:
   a bus having a signal line to notify to the facing equipment of data required by the facing equipment on the upper transmission path and the transmission commencement of data on the lower transmission path.

10. A data communication control device, as set forth in claim 1, wherein the word lengths of the data transmitted via the lower transmission path and the upper transmission path are equal.

11. A data communication control device, as set forth in claim 10, further comprising:
    a notification unit which transmits to the facing equipment, via a path other than the lower transmission path, transmission state data output by said transmission state monitor unit.

12. A data communication control device, as set forth in claim 11, further comprising:
    a bus having a signal line to notify the facing equipment of data required by the facing equipment on the upper transmission path and the transmission commencement of data on the lower transmission path.

* * * * *

UNITED STATES PATENT AND TRADEMARK OFFICE
CERTIFICATE OF CORRECTION

PATENT NO. : 5,745,704
DATED : April 28, 1998
INVENTOR(S) : Seiichi Yasukawa

It is certified that error appears in the above-identified patent and that said Letters Patent is hereby corrected as shown below:

Signed and Sealed this

Twenty-eighth Day of December, 1999

Attest:

Attesting Officer

Q. TODD DICKINSON

Acting Commissioner of Patents and Trademarks